United States Patent [19]
Shuert

[11] Patent Number: 4,989,731
[45] Date of Patent: Feb. 5, 1991

[54] BULK CONTAINER

[76] Inventor: Lyle H. Shuert, 1034 Stratford Pl., Bloomfield Hills, Mich. 48013

[21] Appl. No.: 489,331

[22] Filed: Mar. 5, 1990

Related U.S. Application Data

[63] Continuation-in-part of Ser. No. 219,042, Feb. 14, 1988, Pat. No. 4,936,451.

[51] Int. Cl.$^5$ .............................................. B65D 19/06
[52] U.S. Cl. .................................. 206/386; 108/55.1; 206/598; 206/600
[58] Field of Search ...................... 220/73, 74, 47, 1.5; 229/104; 206/386, 598, 599, 600; 108/55.1, 56.1, 56.3, 901

[56] References Cited

U.S. PATENT DOCUMENTS

| | | | |
|---|---|---|---|
| 2,893,588 | 7/1959 | Martin | 220/4 |
| 2,918,190 | 12/1959 | Martin | 220/4 |
| 3,478,914 | 11/1969 | Williams | 220/4 |
| 3,502,237 | 4/1970 | Verhein et al. | 220/4 |
| 3,986,659 | 10/1976 | Vajtay | 229/43 |
| 4,550,830 | 11/1985 | Shuert | 206/386 |
| 4,742,781 | 5/1988 | Shuert | 108/53.3 |
| 4,765,252 | 8/1988 | Shuert | 108/55.1 |

Primary Examiner—Joseph Man-Fu Moy
Attorney, Agent, or Firm—Krass & Young

[57] ABSTRACT

A container especially suitable for bulk materials and inlcuding a cardboard tubular sleeve having its lower edge portion positioned in upwardly opening groove means on a plastic pallet. The tubular sleeve is a sleeve assembly comprising inner and outer tubular sleeves respectively formed of first and second corrugated cardboard structures with the inner sleeve positioned telescopically within the outer sleeve and with the outer annular surface of the inner sleeve secured to the inner annular surface of the outer sleeve to form a composite sleeve assembly having a thickness approximating the width of the groove means on the pallet. An auxiliary cardboard sheet is secured to the outboard surface of the outer tubular sleeve and an auxiliary cardboard sheet is secured to the inboard surface of the inner cardboard sleeve. A vinyl sheet is adhesively secured to the auxiliary cardboard sheet of the outer tubular sleeve and a further vinyl sheet is adhesively secured to the auxiliary cardboard sheet of the inner tubular sleeve so that, with the inner and outer tubular sleeves telescopically assembled, the vinyl sheets form the inner and outer annular surfaces of the composite sleeve assembly. The vinyl sheets also cover the upper and lower annular end edges of the sleeve assembly so as to make the sleeve assembly substantially moisture impervious.

54 Claims, 6 Drawing Sheets

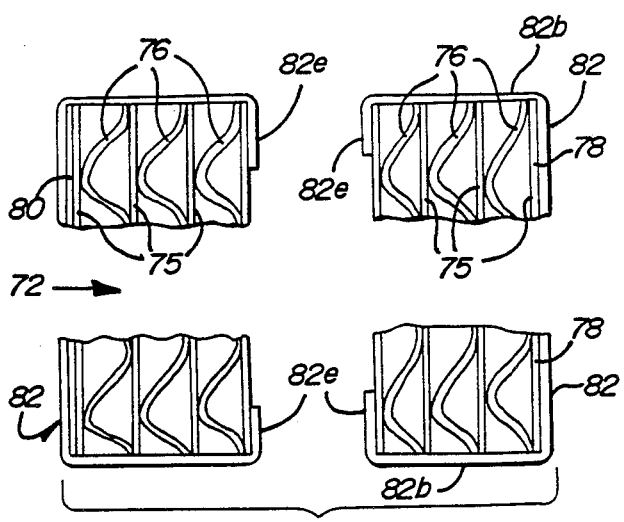
FIG-6
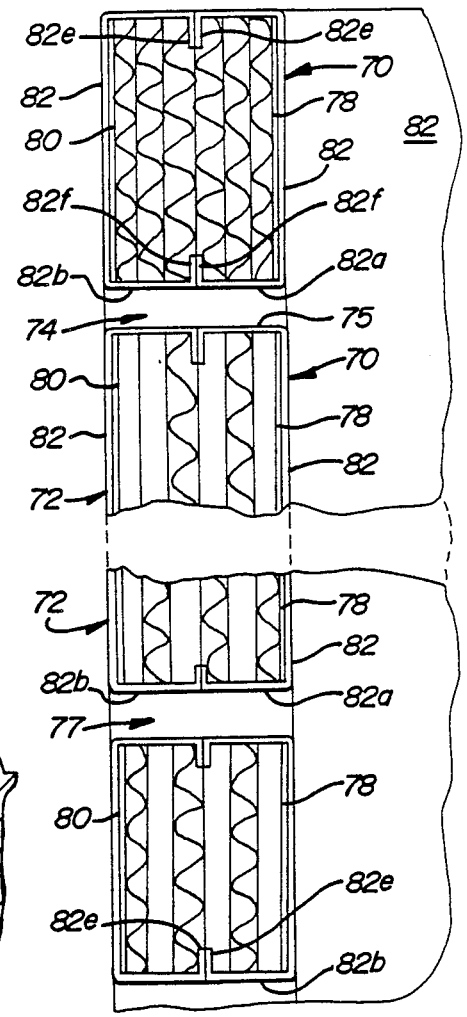
FIG-7
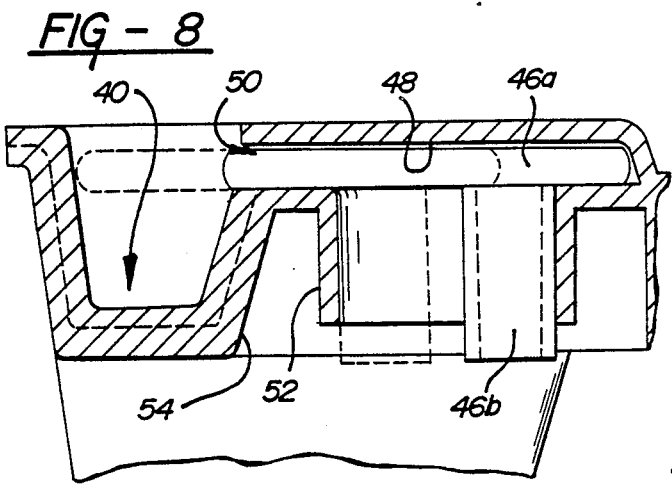
FIG-8
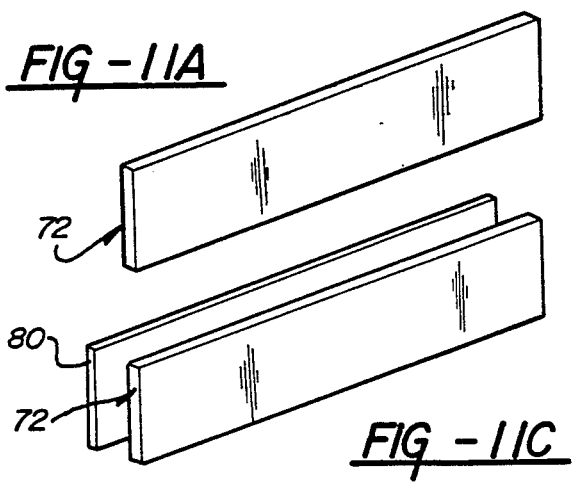
FIG-11A
FIG-11C
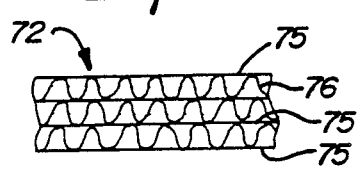
FIG-11B
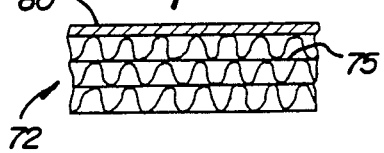
FIG-11D

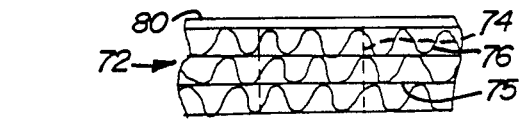
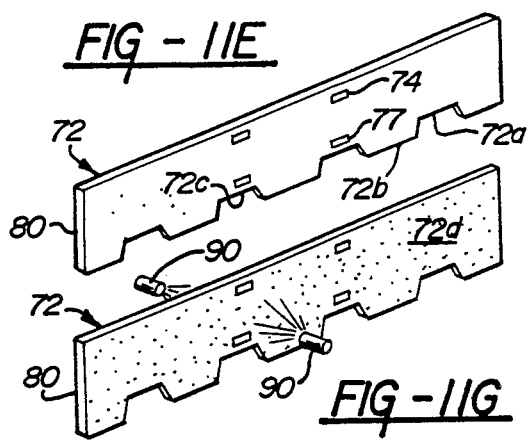
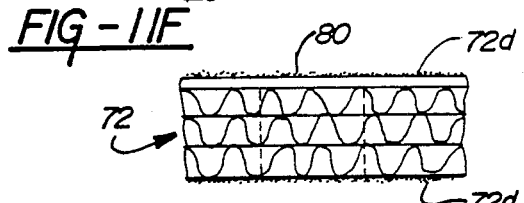
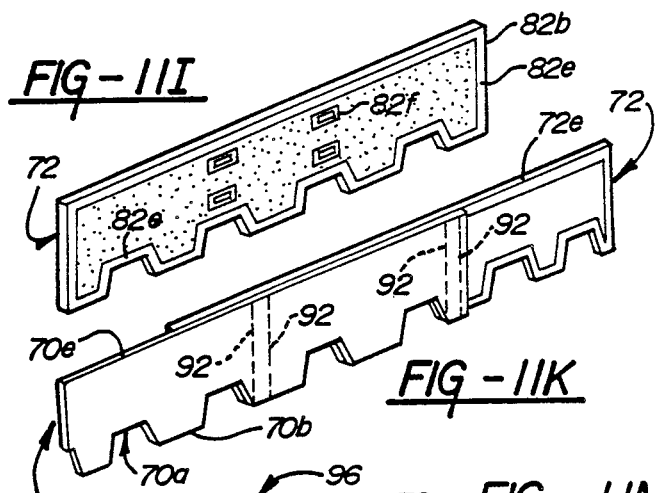
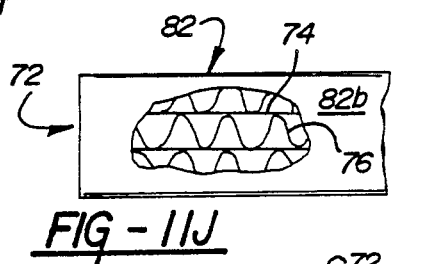
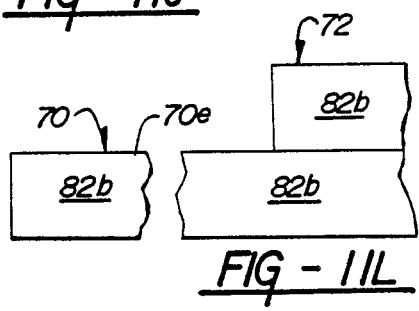
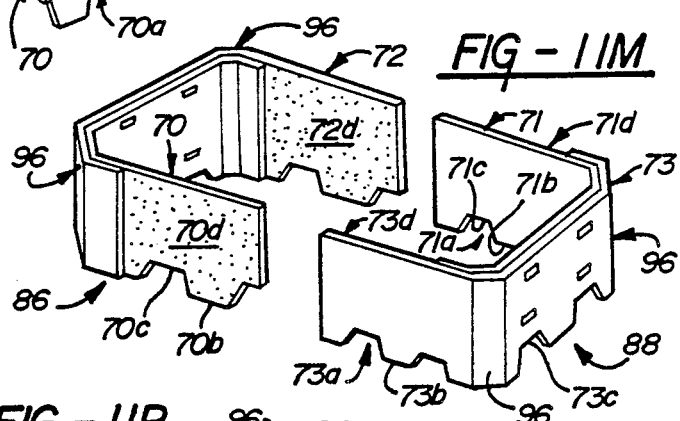
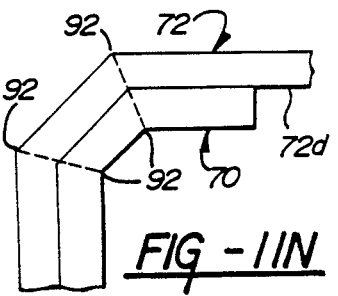
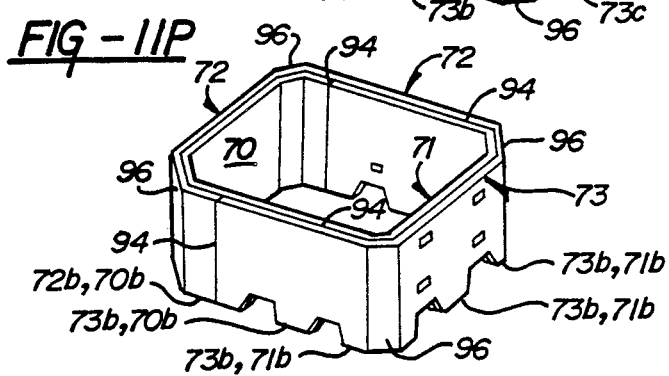
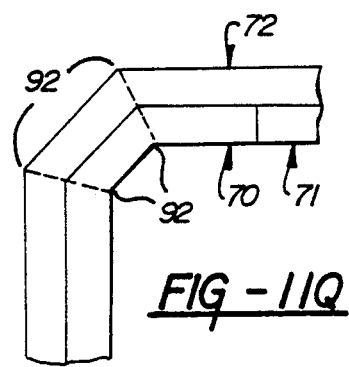

BULK CONTAINER

This application is continuation-in-part of parent application Ser. No. 219,042 filed Feb. 14, 1988 now U.S. Pat. No. 4,936,451.

FIELD OF THE INVENTION

This invention relates to containers and more particularly to containers that are especially suitable for use with bulk materials.

Although a plurality of diverse containers are available in the marketplace, few if any of the available containers are totally suitable for use in shipping and storing bulk materials. Bulk materials pose peculiar requirements with respect to containers since their flow patterns and their angle of repose create extremely high bursting pressures especially in the lower regions of the material within the container. Containers for discrete, free standing articles, by comparison, need only contain the discrete articles, and in general need not deal with the extremely high bursting pressures present in the case of bulk materials.

SUMMARY OF THE INVENTION

This invention is directed to the provision of an improved container.

More specifically, this invention is directed to the provision of a bulk container which is simple and inexpensive in design and yet which successfully withstands the extremely high burst pressures generated by stored bulk materials.

The invention container is of the type comprising a rigid plastic pallet and a tubular sleeve adapted to be supported in upstanding fashion on the upper face of the pallet to form the container. According to the invention, the wall of the sleeve has a sandwich cross-sectional construction including an inner plastic layer, a central cardboard layer, and an outer plastic layer. This sandwich construction for the sleeve allows the use of inexpensive and readily available cardboard and plastic materials to form the sleeve while providing a strong moisture impervious construction for the sleeve.

According to a further feature of the invention, the central cardboard layer comprises a corrugated cardboard layer. This arrangement allows the use of readily available and inexpensive corrugated cardboard materials to form the sleeve.

According to a further feature of the invention, the inner and outer plastic layers comprise vinyl layers. This arrangement allows the use of readily available vinyl sheets to be employed in combination with the readily available corrugated cardboard to form the sleeve assembly.

According to a further feature of the invention, the plastic layers further cover the upper and lower annular end edges of the sleeve. This arrangement provides a moisture impervious construction for the sleeve so as to allow outdoor storage of the sleeve and enhance the usability and reusability of the sleeve in applications, such as food handling, where sanitation is important.

According to a further feature of the invention, the central cardboard layer comprises inner and outer tubular sleeves respectively formed as first and second corrugated cardboard structures with the inner sleeve positioned telescopically within the outer sleeve and with the outer annular surface of the inner sleeve secured to the inner annular surface of the outer sleeve to form a composite sleeve assembly. This construction provides a sleeve assembly employing simple, inexpensive plastic and cardboard materials and yet which is able to withstand the extremely high bursting pressures generated by stored bulk materials.

According to a further feature of the invention, the inner and outer cardboard structures each comprise two cardboard panels arranged end-to-end; one cardboard panel of the outer cardboard structure is secured to one panel of the inner cardboard structure in staggered relation and the secured panels are formed into a first partial sleeve assembly; the other cardboard panel of the outer cardboard structure is secured to the other panel of the inner cardboard structure in staggered relation and the secured panels are formed into a second partial sleeve assembly; and the first and second partial sleeve assemblies are brought together in interfitting fashion to form the sleeve assembly. This arrangement provides a simple and efficient method of constructing the sleeve assemblies and results in a sleeve assembly with staggered seams to augment the overall strength of the sleeve assembly.

According to a further feature of the invention, the pallet includes downwardly opening tunnels extending across the lower face thereof for receipt of the forks of a forklift truck and groove means are defined around the periphery of the upper face of the pallet over the tunnels for receipt of the lower edge of the sleeve. This arrangement provides a simple and effective means of providing means for receipt of the lower edge of the sleeve and simultaneously provides the requisite tunnels for receipt of the forks of a forklift truck.

According to a further feature of the invention, coacting means are provided to releasably secure the sleeve to the pallet, the coacting means comprise slots in the lower peripheral edge of the sleeve and a plurality of latch members mounted on the upper face of the pallet over the tunnels, and the vinyl sheets forming the inner and outer plastic layers of the sleeve assembly further serve to provide a lining for the slots in the sleeve. This arrangement further augments the moisture impervious character of the sleeve and augments the durability of the slots.

BRIEF DESCRIPTION OF THE DRAWINGS

FIG. 6 is a fragmentary cross sectional view illustrating details of the invention sleeve assembly;

FIG. 7 is a fragmentary view illustrating further details of the invention sleeve assembly;

FIGS. 8–10 are detailed views illustrating a latch mechanism employed in the invention container;

FIG. 11 illustrates steps in the methodology employed in forming the invention container.

DETAILED DESCRIPTION OF THE PREFERRED EMBODIMENT

Figure 1:
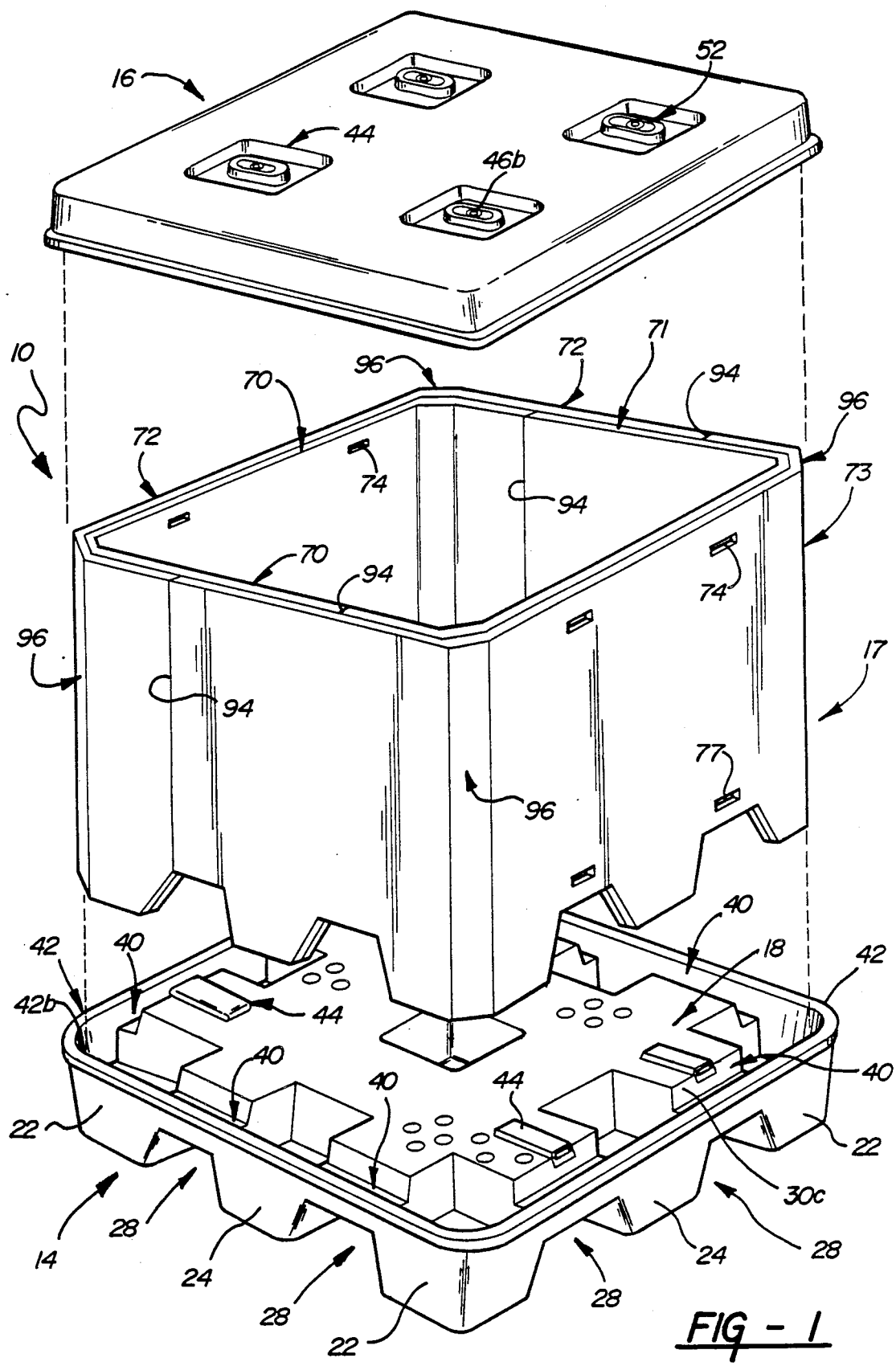
FIG. 1 is an exploded perspective view of the invention container.
Figure 2:
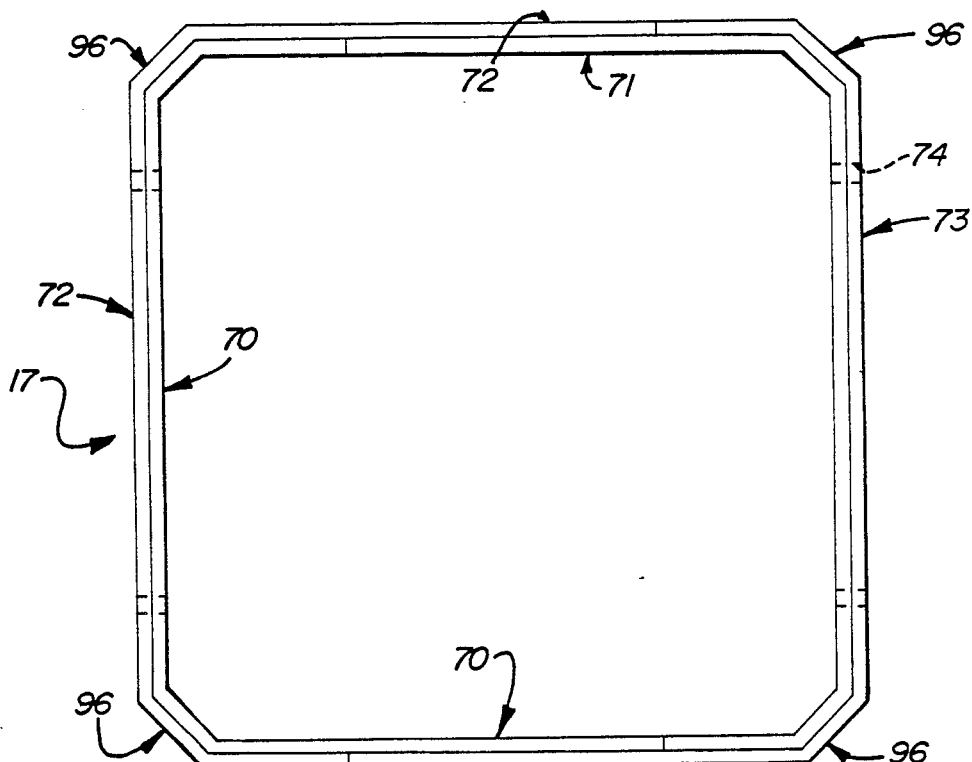
FIG. 2 is a top plan view of a sleeve assembly utilized in the invention container.
Figure 3:
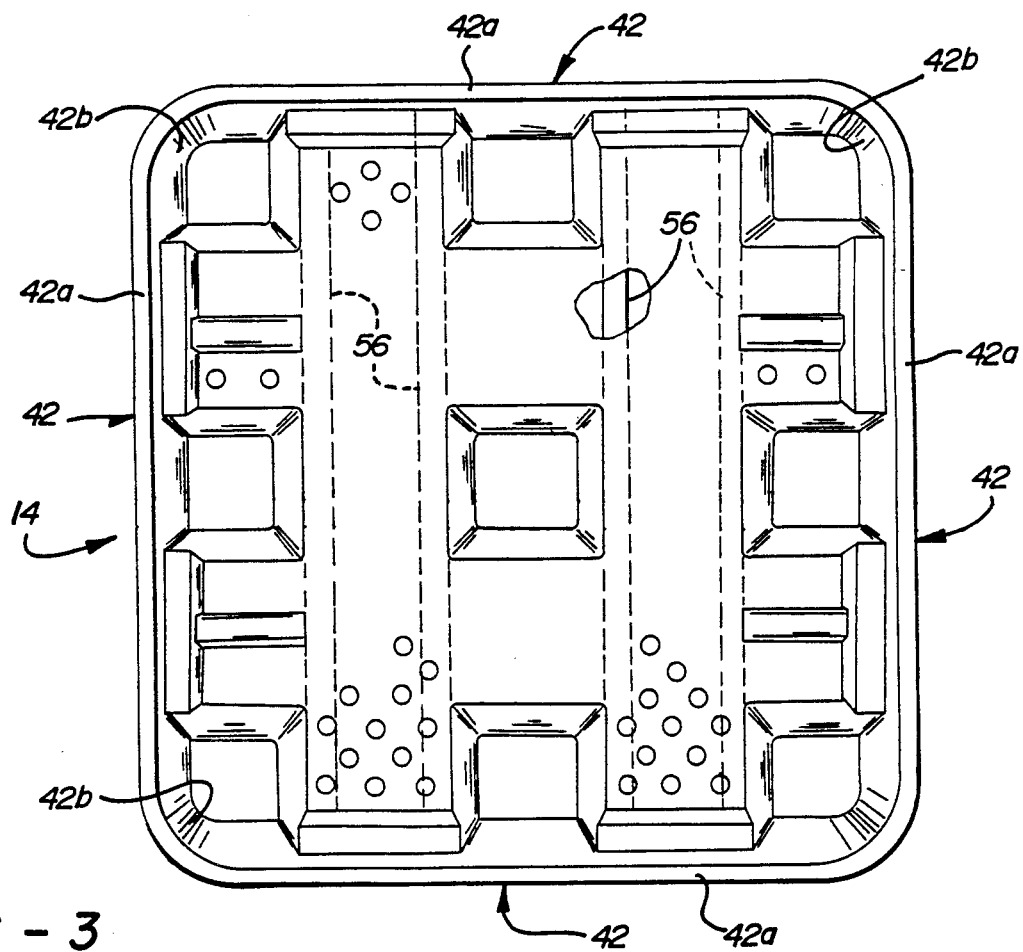
FIG. 3 is a top plan view of a pallet utilized in the invention container.
Figure 4:
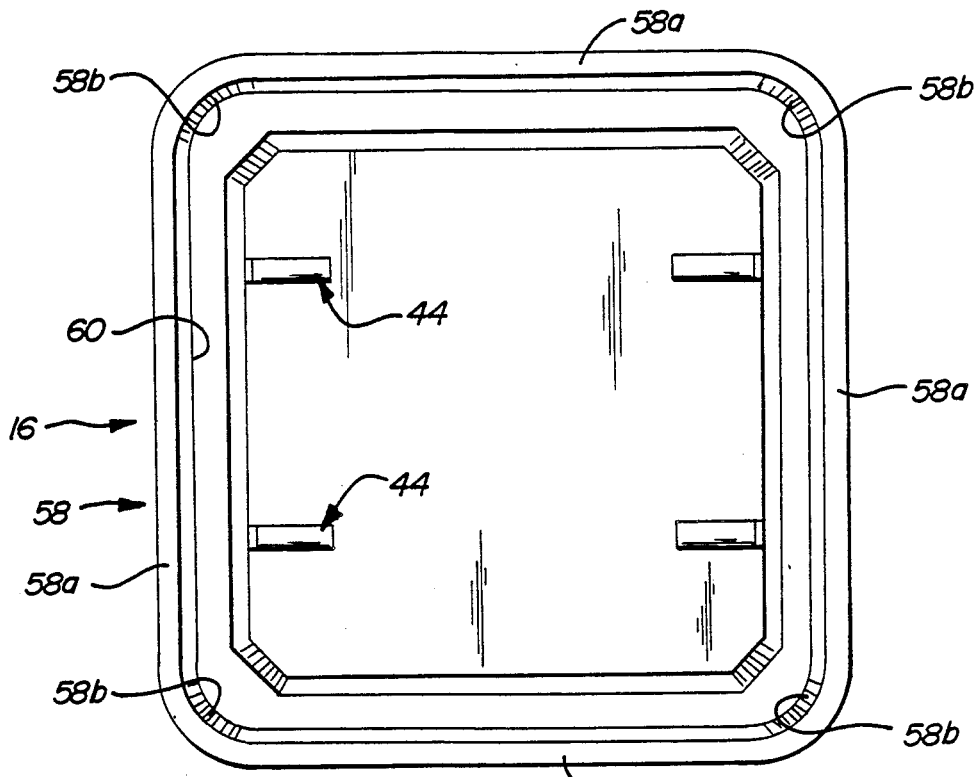
FIG. 4 is a bottom plan view of a lid utilized in the invention container.

The container 10 seen in FIG. 1 is a composite plastic and cardboard design employing a pallet 14, an upper unit or lid 16, and a sleeve assembly 17.

The pallet 14 and lid 16 are formed of a plastic material and are preferably formed of sheets of organic polymeric material such as polyethylene. Pallet 14 and lid 16 preferably employ a twin sheet construction employing two sheets which are vacuum formed and then fused or knitted together at various points to add structural rigidity.

Pallet 14 is generally planar and includes a flat platform structure 18, defining a flat upper load face 20, and a plurality of hollow legs extending downwardly from platform structure 18 and opening in upper face 18. As shown, corner legs 22 are provided at each corner of the pallet, intermediate legs 24 are provided at an intermediate location along each side of the pallet, and a central leg 26 is provided centrally of the pallet. Legs 22, 24 and 26 will be seen to cooperate to define tunnels or indentations 28 extending transversely and longitudinally across the lower face of the pallet to provide relieved access areas for receiving the forks of a forklift truck or the like. As a consequence, the container may be lifted and moved by conventional warehousing equipment.

Pallet 14 includes an upper vacuum formed sheet 30 forming the upper face 20 of the platform structure 18 and a lower vacuum formed sheet 32 forming the lower face 34 of the platform structure 18. Upper sheet 30 includes a plurality of downwardly extending protrusions 30a which are knitted or fused to upwardly extending protrusions 32a on lower sheet 32 to form the platform structure 18. Further details of this protrusion structure are shown in U.S. Pat. No. 4,879,956 assigned to the assignee of the present application. Sheets 30 and 32 also include leg portions 30b, 32b, respectively, which are fused or knitted together to form the legs 22, 24 and 26.

Upper sheet 30 further includes a plurality of circumferentially spaced upwardly opening U-shaped edge portions 30c positioned over each tunnel 28 and coacting to define a plurality of upwardly opening groove means 40 spaced circumferentially around the periphery of the pallet. Sheets 30,32 also include outer upwardly extending portions 30d, 32c fused together to form a continuous rim 42 extending around the periphery of the pallet. Rim 42 is configured to define side wall portions 42a along the four sides of the pallet and angled or rounded corner portions 42b at each corner of the pallet extending on a bias across the corners of the pallet between adjacent rim sides 42a.

The various fuse or knit lines as between the upper sheet 30 and the lower sheet 32 are indicated by dash lines in the drawings.

A plurality of latch assemblies 44 are provided on pallet 14 at circumferentially spaced locations thereabout. For example, a pair of latch assemblies 44 may be provided along two opposite sides of the pallet with each latch assembly located over a tunnel 28 and therefor in association with a groove means 40. Each latch assembly 44 includes a latch member 46 mounted on the pallet for detented sliding movement between a retracted position in which the related sleeve assembly edge is free to enter or leave the related groove means 40 and an extended or locking position in which the tip of the latch member extends across the groove means.

Latch members 46 are preferably formed of the same plastic material as the pallet and each includes a main body portion 46a in the form of a elongated plate and a tubular handle or actuator portion 46b formed integrally with main body portion 46a adjacent one end thereof. Latch members 46 are slidably positioned between the upper and lower sheets 30,32 of the pallet. Specifically, the upper and lower sheets are configured to define slideways 48 extending perpendicularly inwardly from groove means 40 and opening at their outboard ends 50 in these groove means. Latch members 46 are positioned in slideways 48 with latch handle portions 46b received in detent structures 52 formed integrally with the lower sheet 32 of the pallet and disposed in downwardly opening hollows or depressions 54 formed in the lower sheet at the outboard ends of the tunnels 28 between adjacent pallet legs. Detent structures 52 have a generally figure eight formation with the neck 52a at the juncture of the two halves 52b, 52c of the detent dimensioned to be slightly smaller than the external diameter of latch handle portion 46d so that the handle portion 46b passes snappingly between detent halves 42b and 42c as the latch moves between its retracted and extended positions in response to a pull or push exerted by a finger or fingers inserted into the open end of handle portion 46b.

Pallet 14 is preferably formed in a twin sheet press in which the two sheets 30,32 are individually vacuum formed and thereafter fused or knitted together to form the double wall structure. The pallet also preferably includes a plurality of tubular steel members 56, of rectangular cross section, positioned between the upper and lower sheets 30,32 and extending in parallel spaced relation across the full width of the pallet to augment the structural rigidity of the pallet.

Lid 16 is a planar twin sheet vacuum formed structure and is devoid of the legs of the pallet 14 and thereby devoid of the tunnels formed between the legs of the pallet. Lid 16 defines a rim 58 extending continuously around the periphery of the lid and defining the outer wall or border of a downwardly opening groove 60 extending continuously around the periphery of the lid. Rim 58 is configured to define side wall portions 58a along the four sides of the lid and angled or rounded corner portions 58b at each corner of the lid extending on a bias across the corners of the lid between adjacent lid sides 58a.

Lid 16 further includes latch assemblies 44 on the lower face of the lid identical to the latch assemblies utilized on pallet 14. The latch assemblies 44 provided on the lower face of lid 16 correspond in number and circumferential positioning to the latch assemblies provided on the upper face of the pallet 14. The latch members 46 of the lid latch assemblies are positioned between a retracted position in which they are disposed inboard of the groove 60 and an extended latching position in which they extend across the groove.

Sleeve assembly 17 is formed from a pair of inner cardboard panels or strips 70,71 and a pair of outer cardboard panels or strips 72,73. Panels 70–73 are preferably formed of three-ply corrugated material such as is commercially available from Tri-Wall Containers Inc. Each panel 70–73 is formed in known manner of a plurality of flat primary cardboard sheets 75 interspersed with and adhesively secured to a plurality of corrugated cardboard sheets 76 with flat primary sheets 75 disposed on the inner and outer surfaces respectively of the panel so as to form a multi-layer sandwich construction. In addition, a flat auxiliary cardboard sheet 78 is secured to the inboard face of inner panels 70,71 and a flat auxiliary cardboard sheet 80 is secured to the outboard face of outer panels 72,73.

By way of example, auxiliary sheets 78,80 and the sheets 75 forming the outer faces of each panel may have a weight of 96 pounds per 1000 square feet and a thickness of 0.026 inches; intermediate sheets 75 may have a weight of 69 pounds per 1000 square feet and a thickness of 0.019 inches; and corrugated sheets 76 may have a weight of 33 pounds per 1000 square feet and a thickness of 0.011 inches.

Panels 70–73 are configured along their lower edges in a manner to match the configuration of the pallet 14. Specifically, a plurality of cut-outs 70a, 71a, 72a, 73a are provided in circumferentially spaced fashion around the lower peripheral edge of the panels to define a plurality of legs 70b, 71b, 72b, 73b configured to fit respectively within the hollow legs 22, 24 and 26 of the pallet with the edges 70c, 71c, 72c, 73c at the tops of the cutouts positioned in groove means 40 defined by the pallet.

A plurality of slots or apertures 74 are provided at circumferentially spaced locations along the upper edge portions of panels 70–73 and a corresponding plurality of slots or apertures 77 are provided along the lower peripheral edges of panels 70–73 proximate and above edges 70c, 71c, 72c, 73c.

The methodology of performing the invention sleeve assembly is seen in FIG. 11. Specifically, FIGS. 11(a)–11(j) illustrate the formation of the outer panel 72; FIGS. 11(k) and 11(l) illustrate the combination of outer panel 72 with inner panel 70 to form a panel subassembly; FIGS. 11(m) and 11(n) illustrate the formation of first and second partial sleeve assemblies 86 and 88; and FIGS. 11(p) and 11(q) illustrate the combining of the partial sleeve assemblies 86 and 88 to form the final sleeve assembly 17.

According to the invention methodology, a sheet or panel 72 of standard triple wall corrugated construction is provided including flat sheets 75 interspersed with corrugated sheets 76; an auxiliary or supplemental cardboard sheet 80 is adhesively secured to the outer face of panel 72 so as to combine with the outer sheet 75 to provide a reinforced outer skin for the panel; the panel is suitably die cut to provide slots 74,77 and cutouts 72a; spray guns 90 are utilized to adhesively spray the inner and outer faces of the panel with a heat activated cement (such for example as the type available from PPG Adhesives and Solvents of Madison Heights, Mich., as Part No. HC7111) to provide a cement coating 72d entirely covering the inner and outer faces of the panel; a sheet of vinyl material 82 is heated and applied in a back forming vacuum operation (see also FIG. 12) to the outer face of the panel to form a vinyl coating entirely covering the outer face of the panel and extending over the upper and lower and left and right end edges of the panel and lining the apertures 74,77 of the panel; heat is applied to the inner face of panel 72 and to the inner face of panel 70 (which has been formed in the same manner as panel 72, according to the steps illustrated in FIGS. 11(a)–11(j), to include auxiliary supplemental cardboard sheet 78 and outer sheet of vinyl material 82) to activate the cement coating 72(d), 70(d) and the panel interfaces are pressed together to form a panel subassembly with panels 70 and 72 staggered so as to form a free end portion 72e of panel 72 and a free end portion 70e of panel 70; the panel subassembly is scored along lines 92 and folded along lines 92 to form the sleeve subassembly 86 seen in FIG. 11m; sleeve subassembly 88 is formed from panel 71 and 73 following steps 11(a) through 11(n); and heat is applied to the exposed cement coating 70d, 71d, 72d, and 73d and the sleeve subassemblies are brought together in nesting interfitting fashion to form the final sleeve assembly 17 as seen in FIG. 11(p).

In the final sleeve assembly, the inner and outer faces as well as the upper and lower annular edges of the sleeve assembly are totally sealed by the vinyl layers 82 so that the sleeve assembly is virtually moisture impervious; the auxiliary sheets 80 on the outer annular surface of the sleeve assembly coact with the outer sheets 75 of the outer panels to form a strong outer skin capable of withstanding substantial tension loading; the inner auxiliary sheets 78 coact with the inner sheets 75 of the inner cardboard panels to provide a strong inner skin for the sleeve assembly capable of withstanding high compressive loading; and the seams 94 between the abutting vertical end edges of the panels 70, 71, 72 and 73 are staggered or circumferentially spaced around the circumference of the sleeve assembly to increase the structural rigidity of the sleeve assembly.

Note that score lines 92 are provided in circumferentially spaced pairs so that angled corner portions 96 are provided in each sleeve subassembly and four angled corner portions 96 are provided in the final sleeve assembly.

Figure 12:
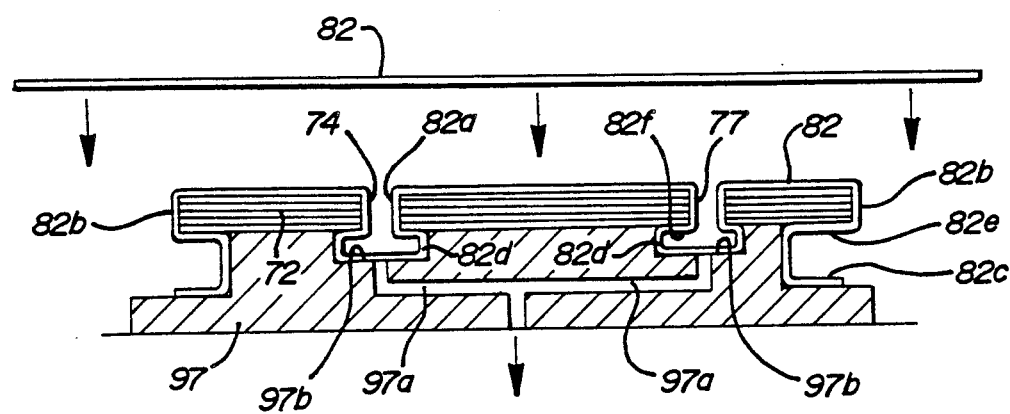
FIG. 12 illustrates further details of one of the steps of the methodology illustrated in FIG. 11.

The manner in which the vinyl sheet or skin 82 is back formed to the various panels is best seen in FIG. 12. Specifically, the panel is positioned over a back forming die 97 and the vinyl sheet 82 is heated in an oven and is positioned over the upper face of the panel whereafter vacuum is applied to the upper face of the die via channels 97a opening in cavities 97b underlying apertures 74 and 76 so as to suck the heated sheet downwardly into firm compliance with the upper face of the panel, suck portions 82a into the apertures 74,77 to form a lining for the apertures, and suck portions 82b downwardly over the end edges of the panel and around the inner or under face of the panel, following which the excess vinyl portions such as seen at 82c and 82d may be suitably trimmed to provide the final vinyl covered panel construction including an edge portion 82e extending around the inner face of the panel, including around the cutouts in the lower edge of the panel, and an annular border portion 82f on the inner face of the panel around the apertures 74 and 77.

It will be understood that the heated vinyl sheet 82 activates the heat activated cement coating 72d so that the vinyl sheet is firmly and adhesively secured to the panel.

It will further be understood that the vinyl sheet 82 is stretchable to allow the sheet to be sucked downwardly into the aperture 74 and 77 and allow the sheet to be wrapped around the end edges of the panel so that the thickness of the vinyl coating on the panel varies depending upon the extent to which the vinyl has been stretched to achieve its final disposition with respect to the panel.

It will further be understood that the apertures in the upper and lower edge portions of the various panels are arranged such that they are mutually aligned in the final sleeve assembly and, similarly, the cutouts in the lower edges of the various panels are arranged such that the cutouts are mutually aligned in the final sleeve assembly.

The final sleeve assembly, as seen in FIG. 11(p), may now be utilized in cooperation with the pallet 14. Specifically, as the sleeve assembly 17 is lowered into position over the pallet 14, the leg portions of the sleeve assembly, formed by the joined leg portions 70b, 71b, 72b, 73b of the individual panels, fit respectively into the hollow legs of the pallet and rest on the bottom walls of the pallet legs; the cut out edge portions of the sleeve assembly, formed by the joined cut out edge portions 70c, 71c, 72c, 73c of the individual panels, fit into and rest against the bottom edges of the groove means 40 with the apertures 77 aligned with the latch members 46 of the respective latch assemblies; and the angled corner portions 96 of the sleeve fit conformingly into and against angled rim corner portions 42b so that the angled rim corner portions of the pallet embrace the outer surfaces of the lower edge portions of the angled corner portions of the sleeve assembly.

Following placement of the sleeve assembly into the pallet, the latch members 46 may be moved outboard, utilizing handles 46b, to pass the outboard tips of the latch members through the apertures 77 and preclude inadvertent separation of the sleeve assembly from the pallet.

The seating of the lower edges of the leg portions of the sleeve assembly on the bottom walls of the pallet legs also has the desirable effect of transferring compressive loads from stacked containers directly to the base or support surface for the container, as explained more fully in U.S. Pat. Nos. 4,550,830 and 4,765,252 assigned to the assignee of the present application.

Figure 5:
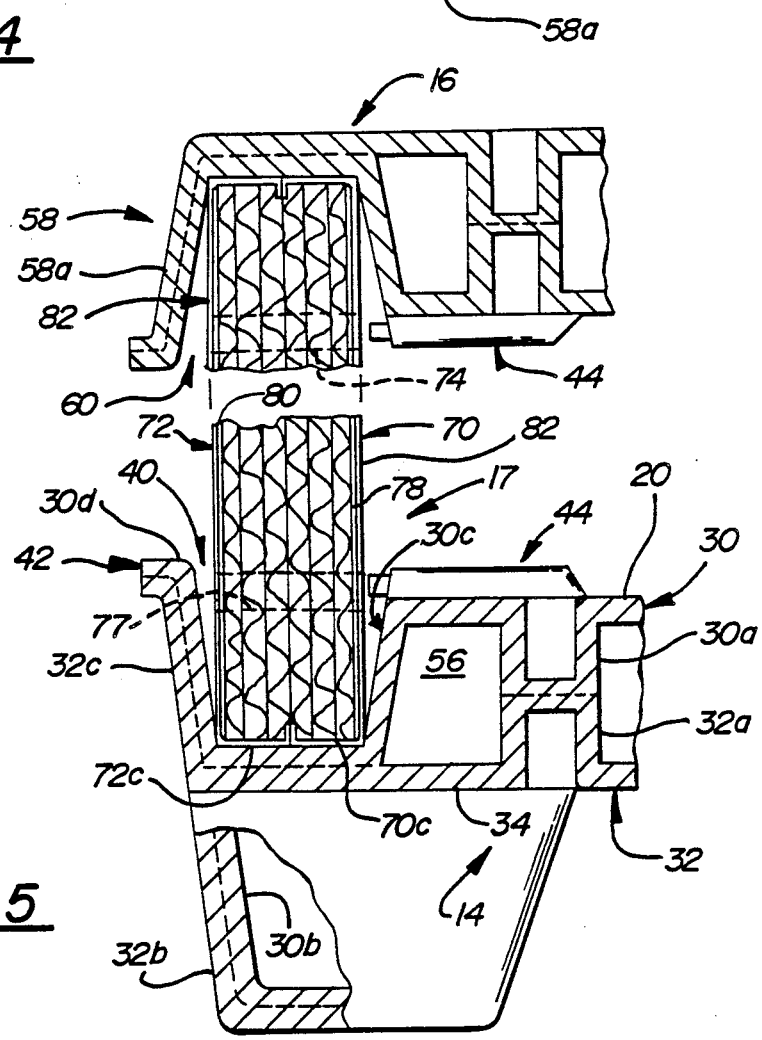
FIG. 5 is a fragmentary cross sectional view illustrating the cooperative interaction of the invention sleeve assembly, the invention pallet, and the invention lid.
Figure 9:
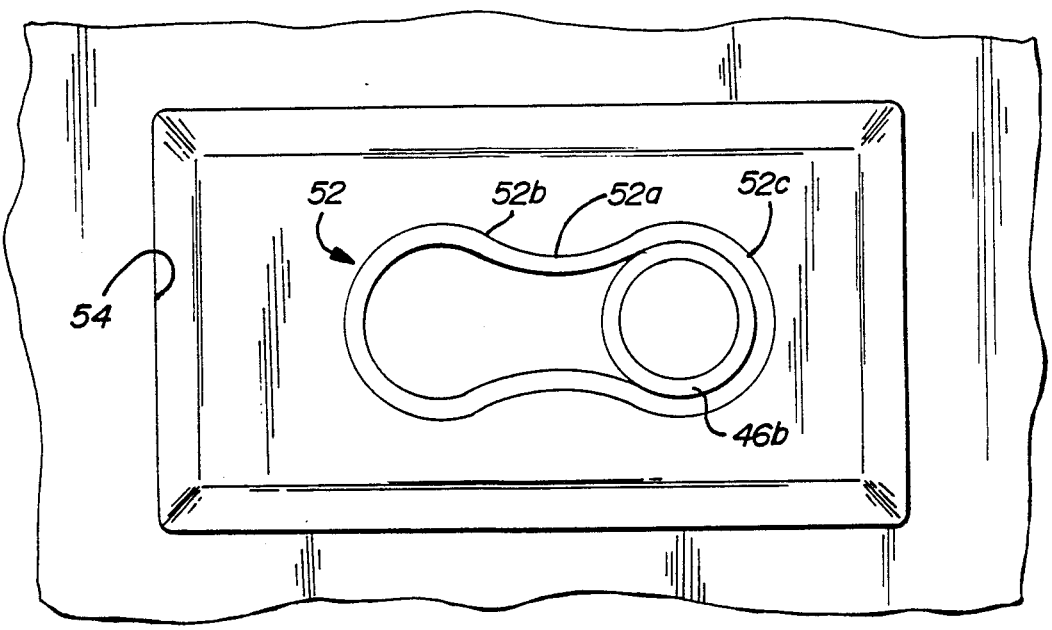
Figure 10:
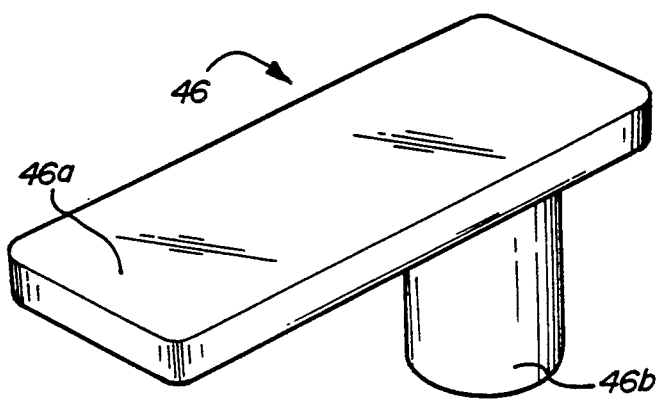

As best seen in FIG. 5, the thickness of the sleeve assembly, as defined by the combined thicknesses of panels 70,72 and 71,73, as augmented by auxiliary panels 78,80 and vinyl sheets 82, approximates the thickness of the groove means 40 at the bottoms of the groove means so that the cutout edges 70c, 71c, 72c, 73c of the sleeve assembly fit snugly in the groove means to preclude unwanted lateral movement of the sleeve assembly relative to the pallet.

Following the loading of the container with a suitable bulk material, lid 16 is placed over the upper edge of the sleeve assembly with the upper edge of the sleeve assembly fitting snugly in groove 60, including fitting of angled corner portions 96 into and against angled lid corner rim portions 58b, whereafter the latch members 46 of the latch assemblies of the lid may be moved outwardly in detenting fashion to move the latch members into the aligned apertures 74 and preclude inadvertent removal of the lid from the container. It will be understood that the lid acts to constrain the upper circumferential edge of the sleeve assembly against outward, bulging movement in response to the pressures generated by the stored bulk materials but that, due to the burst strength of the sleeve assembly, the container may be fully loaded with bulk material with the lid removed without fear of bulging of the upper edge of the sleeve assembly so that the container may, if desired, be loaded, transported, stored and the like without lid 16 in place.

The invention container, although formed from inexpensive cardboard and plastic materials in a relatively inexpensive process, provides a container having extremely high sidewall strength, so as to be eminently suitable for use in storing bulk materials, and having a virtually moisture impervious construction, so as to enhance its durability and allow outdoor use and storage. The sealed aspect of the sleeve also precludes entry of contaminants, such as food particles, into the flutes of the cardboard structures so as to enhance the usability and reusability of the invention container in applications, such as food handling, where sanitation is important.

Whereas a preferred embodiment of the invention has been illustrated and described in detail, it will be apparent that various changes may be made in the disclosed embodiment without departing from the scope or spirit of the invention.

I claim:

1. A container of the type comprising a rigid plastic pallet and a tubular sleeve adapted to be supported in upstanding fashion on the upper face of the pallet to form the container, characterized in that the wall of the sleeve has a sandwich cross-sectional configuration including an inner plastic layer, a central cardboard layer, and an outer plastic layer.

2. A container according to claim 1 wherein said central cardboard layer comprises a corrugated cardboard layer.

3. A container according to claim 2 wherein said inner and outer plastic layers comprise vinyl layers.

4. A container according to claim 2 wherein said corrugated cardboard layer comprises a multiple wall corrugated layer.

5. A container according to claim 4 wherein said multiple wall corrugated layer comprises an inner cardboard panel of multiple wall construction secured in back-to-back relation to an outer cardboard panel of multiple wall construction.

6. A container according to claim 5 wherein each of said cardboard panels has a triple wall construction so that said cardboard layer comprises six sublayers.

7. A container according to claim 6 wherein said inner and outer plastic layers comprise vinyl layers.

8. A container according to claim 5 wherein:
each cardboard panel comprises a plurality of flat cardboard sheets interspersed with corrugated cardboard sheets;
a supplemental flat cardboard sheet is secured to the outer face of said outer cardboard panel and a supplemental flat cardboard sheet is secured to the inner face of said inner cardboard panel; and
said outer plastic layer comprises a vinyl sheet secured to the exposed face of the supplemental sheet of the outer cardboard panel and said inner plastic layer comprises a vinyl sheet secured to the exposed face of the supplemental sheet of the inner cardboard panel.

9. A container according to claim 1 wherein said pallet defines upwardly facing receiving means on its upper face for receipt of the lower peripheral edge of said sleeve.

10. A container according to claim 9 wherein said upwardly facing receiving means comprises upwardly opening groove means.

11. A container according to claim 10 wherein said container further comprises coacting means proximate said lower peripheral edge of said sleeve and on said pallet proximate said groove means for releasably securing said sleeve to said pallet.

12. A container according to claim 11 wherein said pallet includes downwardly extending legs defining downwardly opening tunnels therebetween extending across the lower face of the pallet for receipt of the forks of a forklift truck and the groove means are defined around the periphery of the upper face of the pallet over the tunnels.

13. A container according to claim 12 wherein said pallet, said groove means, and said sleeve each have a rectangular configuration.

14. A container according to claim 1 wherein said plastic layers further cover the upper and lower annular end edges of said sleeve.

15. A container according to claim 14 wherein said pallet includes a plurality of latch members, said sleeve includes a plurality of slots for respective receipt of said latch members to releasably secure the sleeve to the pallet, and said plastic layers form a lining for said slots.

16. A container according to claim 1 wherein said sleeve includes four side portions together defining a rectangle and four angled corner portions at the four corners of the sleeve, and said pallet defines an upwardly extending rim extending around the periphery of the pallet and having a continuous circumferentially inboard face sized to telescopically receive said sleeve and including four side portions sized to respectively embrace the outer surfaces of the lower edge portions of the four side portions of the sleeve and four corner portions sized to respectively embrace the outer surfaces of the lower edge portions of the four angled corner portions of the sleeve.

17. A container comprising:
    a plastic pallet defining upwardly opening groove means around the periphery of the upper face of the pallet;
    a tubular sleeve assembly comprising inner and outer tubular sleeves respectively formed of first and second corrugated cardboard structures with said inner sleeve positioned telescopically within said outer sleeve to form a composite sleeve assembly having a thickness approximating the width of said groove means so that the lower peripheral edge of said sleeve assembly may be received snugly in said groove means to define said container; and
    coacting means on said sleeve assembly proximate said lower peripheral edge and on said pallet proximate said groove means for releasably securing said lower edge of said sleeve assembly to said pallet.

18. A container according to claim 17 wherein:
    each said corrugated cardboard structure comprises a multiple ply cardboard structure including a plurality of flat primary cardboard sheets interspersed with a plurality of corrugated cardboard sheets with flat primary inboard and outboard sheets disposed on the inner and outer surfaces respectively of each cardboard structure.

19. A container according to claim 18 wherein:
    said first cardboard structure further includes a flat auxiliary cardboard sheet secured to the outboard sheet of said first cardboard structure and said second cardboard structure further includes a flat auxiliary cardboard sheet secured to the inboard sheet of said second cardboard structure.

20. A container according to claim 17 wherein:
    said sleeve assembly further includes a plastic layer secured to the inner annular surface of said inner sleeve and a plastic layer secured to the outer annular surface of said outer sleeve.

21. A container according to claim 20 wherein:
    said plastic layers further cover the upper and lower annular end edges of said sleeve assembly.

22. A container according to claim 17 wherein:
    said coacting means comprises latch members on said pallet for sliding coaction with slots in said sleeve assembly approximate the lower peripheral edge thereof and said plastic layers further form a lining for said slots.

23. A container according to claim 17 wherein:
    said pallet includes downwardly extending legs defining downwardly opening tunnels therebetween extending across the lower face of the pallet for receipt of the forks of a forklift truck; and
    said groove means are defined around the periphery of the upper face of said pallet over said tunnels.

24. A container according to claim 23 wherein:
    said coacting means comprise slots in said lower peripheral edge of said sleeve assembly and a plurality of latch members mounted on the upper face of said pallet over said tunnels.

25. A pallet according to claim 17 wherein:
    each sleeve includes four side portions together defining a rectangle and four angled corner portions at the four corners of the sleeve so that said sleeve assembly includes four side portions in the form of a rectangle and four angled corner portions; and
    said pallet defines an upwardly extending rim extending around the periphery of the pallet and having a continuous circumferential inboard face sized to telescopically receive said sleeve assembly and including four side portions sized to respectively embrace the outer surfaces of the lower edge portions of the four side portions of the sleeve assembly and four corner portions sized to respectively embrace the outer surfaces of the lower edge portions of the four angled corner portions of the sleeve assembly.

26. A method of forming a container for bulk materials comprising the steps of:
    providing a cardboard panel structure;
    forming a plastic layer on both side faces of the panel structure;
    forming the cardboard structure into a tubular sleeve so as to provide a plastic layer on the inner annular surface of the sleeve and a plastic layer on the outer annular surface of the sleeve encapsulating a cardboard core;
    forming a plastic pallet having upwardly facing receiving means around the periphery of the upper face of the pallet sized to accommodate the lower peripheral edge of said sleeve assembly; and
    positioning the lower peripheral edge of said sleeve assembly on said receiving means to form the bulk container.

27. A method according to claim 26 wherein:
    said step of providing a cardboard panel structure comprises providing inner and outer multiple ply cardboard structures;
    said plastic layer forming step comprises providing a plastic layer on the outer face of said outer cardboard structure and providing a plastic layer on the inner face of said inner cardboard structure; and
    said forming step comprises forming said outer cardboard structure into an outer tubular sleeve, forming said inner cardboard structure into an inner tubular sleeve, positioning said inner tubular sleeve telescopically within said outer tubular sleeve, and securing the outer annular face of said inner tubular sleeve to the inner annular face of said outer tubular sleeve.

28. A method according to claim 27 wherein:

said inner and outer cardboard structures each comprise two cardboard panels arranged end-to-end;

one cardboard panel of the outer cardboard structure is secured to one panel of the inner cardboard structure in staggered relation and the secured panels are formed into a first partial sleeve assembly;

the other cardboard panel of the outer cardboard structure is secured to the other panel of the inner cardboard structure in staggered relation and the second panels are formed into a second partial sleeve assembly; and the first and second partial sleeve assemblies are brought together to form the sleeve assembly.

29. A method of forming a container comprising the steps of:

providing a first elongated corrugated cardboard panel;

securing a vinyl sheet to the outer face of the first cardboard panel;

providing a second elongated corrugated cardboard panel;

securing a vinyl sheet to the inner face of the second cardboard panel;

securing the inner face of the first cardboard panel to the outer face of the second cardboard panel in staggered relation;

forming the first and second cardboard panels into a partial sleeve assembly;

repeating the above steps with respect to a third and fourth cardboard panel to provide a second partial sleeve assembly;

bringing the first and second partial sleeve assemblies together to form a total sleeve assembly having a central cardboard core and inner and outer vinyl layers;

forming a plastic pallet having upwardly facing receiving means around the periphery of the upper face of the pallet sized to accommodate the lower peripheral edge of said sleeve assembly; and positioning the lower peripheral edge of said sleeve assembly on said receiving means to form the container.

30. A method of forming a container for bulk materials comprising the steps of:

providing a first strip of corrugated cardboard material;

providing a second strip of corrugated cardboard material;

forming said first strip into a first tubular sleeve;

forming said second strip into a second tubular sleeve;

positioning said second tubular sleeve telescopically within said first tubular sleeve to form a composite sleeve assembly;

forming a plastic pallet having upwardly opening groove means around the periphery of the upper face of the pallet having a width approximating the thickness of said composite sleeve assembly;

positioning the lower peripheral edge of said composite sleeve in said pallet groove means to form the bulk container; and providing coacting means on said lower peripheral edge of said composite sleeve assembly and on said pallet proximate said groove means for releasably securing said sleeve assembly to said pallet to selectively form and disassemble said container.

31. A method according to claim 30 wherein:

said step of providing a first strip of corrugated cardboard material comprises providing a standard multiple-ply cardboard strip and adding an auxiliary cardboard sheet to the outboard surface of said multiple-ply cardboard strip; and said step of providing a second strip of corrugated cardboard material comprises providing a standard multiple-ply cardboard strip and adding an auxiliary cardboard sheet to the inboard surface of said multiple-ply cardboard strip so that, when said second tubular sleeve is positioned telescopically within said first tubular sleeve, said auxiliary cardboard sheets form the inner and outer annular surfaces of the composite sleeve assembly.

32. A method according to claim 31 and comprising the further steps of securing a vinyl sheet to the exposed outer surface of the auxiliary cardboard sheet of said first tubular sleeve and securing a vinyl sheet to the exposed inner surface of the auxiliary cardboard sheet of the second tubular sleeve.

33. A tubular sleeve for use with a container of the type including a plastic pallet and a tubular sleeve adapted to be supported on the upper face of the pallet to form the container, characterized in that the wall of the sleeve has a sandwich cross-sectional configuration including an inner plastic layer, a central cardboard layer, and an outer plastic layer.

34. A tubular sleeve according to claim 33 wherein said central cardboard layer comprises a corrugated cardboard layer.

35. A tubular sleeve according to claim 34 wherein said inner and outer plastic layers comprise vinyl layers.

36. A tubular sleeve according to claim 34 wherein said corrugated cardboard layer comprises a multiple wall corrugated layer.

37. A tubular sleeve according to claim 36 wherein said multiple wall corrugated layer comprises an inner cardboard panel of multiple wall construction secured in back-to-back relation to an outer cardboard panel of multiple wall construction.

38. A tubular sleeve according to claim 37 wherein each of said cardboard panels has a triple wall construction so that said cardboard layer comprises six sublayers.

39. A tubular sleeve according to claim 38 wherein said inner and outer plastic layers comprise vinyl layers.

40. A tubular sleeve according to claim 37 wherein each cardboard panel comprises a plurality of flat cardboard sheets interspersed with corrugated cardboard sheets, a supplemental flat cardboard sheet is secured to the outer face of said outer cardboard panel and a supplemental flat cardboard sheet is secured to the inner face of said inner cardboard panel, and said outer plastic layer comprises a vinyl sheet secured to the exposed face of the supplemental sheet of the outer cardboard panel and said inner plastic layer comprises a vinyl sheet secured to the exposed face of the supplemental sheet of the inner cardboard panel.

41. A tubular sleeve according to claim 33 wherein said plastic layers further cover the upper and lower annular end edges of said sleeve.

42. A tubular sleeve according to claim 33 wherein said sleeve includes four side portions together defining a rectangle and four angled corner portions at the four corners of the sleeve.

43. A method of forming a sleeve for use with a plastic pallet to form a container, said method comprising the steps of:

providing a cardboard panel structure;
forming a plastic layer on both side faces of the panel structure; and
forming the cardboard structure into a tubular sleeve so as to provide a plastic layer on the inner annular surface of the sleeve and a plastic layer on the outer annular surface of the sleeve encapsulating a cardboard core.

44. A method according to claim 43 wherein said step of providing a cardboard panel structure comprises providing inner and outer multiple-ply cardboard structures, said plastic layer forming step comprises securing a plastic layer on the outer face of said outer cardboard structure and providing a plastic layer on the inner face of said inner cardboard structure, said forming step comprises forming said outer cardboard structure into an outer tubular sleeve, forming said inner cardboard structure into an inner tubular sleeve, positioning said inner tubular sleeve telescopically within said outer tubular sleeve, and securing the outer annular face of said inner tubular sleeve to the inner annular face of said outer tubular sleeve.

45. A method according to claim 44 wherein said inner and outer cardboard structures each comprise two cardboard panels arranged end-to-end, one cardboard panel of the outer cardboard structure is secured to one panel of the inner cardboard structure in staggered relation and the secured panels are formed into a first partial sleeve, the other cardboard panel of the outer cardboard structure is secured to the other panel of the inner cardboard structure in staggered relation and the secured panels are formed into a second partial sleeve, and the first and second partial sleeve assemblies are brought together to form the sleeve.

46. A method of forming a tubular sleeve for use with a pallet to form a container, said method comprising the steps of:
providing a first strip of corrugated cardboard material;
providing a second strip of corrugated cardboard material;
forming said first strip into a first tubular sleeve;
forming said second strip into a second tubular sleeve;
positioning said second tubular sleeve telescopically within said first tubular sleeve; and
securing the outer annular face of said second tubular sleeve to the inner annular face of said first tubular sleeve to form a composite sleeve assembly.

47. A method according to claim 46 wherein:
said step for providing a first strip of corrugated cardboard material comprises providing a standard multiple-ply cardboard strip and adding an auxiliary cardboard sheet to the outboard surface of said multiple-ply cardboard strip; and
said step for providing a second strip of corrugated cardboard material comprises providing a standard multiple-ply cardboard strip and adding an auxiliary cardboard sheet to the inboard surface of said multiple-ply cardboard strip so that, when said second tubular sleeve is positioned telescopically within said first tubular sleeve, said auxiliary cardboard sheets form the inner and outer annular surfaces of the composite sleeve assembly.

48. A method according to claim 47 and comprising the further steps of:
securing a vinyl sheet to the exposed outer surface of the auxiliary cardboard sheet of said first tubular sleeve; and
securing a vinyl sheet to the exposed inner surface of the auxiliary cardboard sheet of said second tubular sleeve.

49. A pallet formed of first and second plastic sheets selectively fused together, said pallet comprising:
a platform section formed of spaced portions of said first and second sheets and defining a generally planar upwardly facing load receiving surface;
a plurality of legs extending downwardly from said platform section at spaced locations about the periphery of said platform section;
a plurality of cavities at spaced locations about the periphery of said platform section with each cavity opening at its upper end in said load receiving surface and extending at its lower end generally to the level of the bottom of said legs; and
a circumferential lip extending around the periphery of said platform section in surrounding relation to said cavities and having an upper edge surface spaced above said load receiving surface.

50. A pallet according to claim 49 wherein:
each leg is formed as a downwardly depending portion of each of said sheets fused together to form a pocket opening upwardly in said load receiving surface and defining a respective one of said cavities.

51. A pallet according to claim 50 wherein:
a groove is defined between each adjacent set of cavities with each groove opening in said load receiving surface and defined at its outboard edge by the inboard surface of said lip and having a bottom surface located at a level intermediate said load receiving surface and said cavity lower ends.

52. A pallet comprising:
a platform section defining a generally planar upwardly facing load receiving surface;
a plurality of legs extending downwardly from said platform section at spaced locations about the periphery of said platform section;
a plurality of cavities at spaced locations about the periphery of said platform section with each cavity opening at its upper end in said load receiving surface and extending at its lower end generally to the level of the bottom of said legs;
a groove extending between each adjacent set of cavities with each groove opening in said load receiving surface and having a bottom surface located at a level intermediate said load receiving surface and said cavity lower ends; and
a circumferential lip extending around the periphery of said platform section and defining at its inboard surface the outboard surfaces of said grooves and said cavities.

53. A pallet according to claim 52 wherein:
said legs are hollow and respectively define said cavities.

54. A pallet according to claim 53 wherein:
said lip has an upper edge spaced above said load receiving surface.

* * * * *